(12) United States Patent
Komamine

(10) Patent No.: US 7,138,578 B2
(45) Date of Patent: Nov. 21, 2006

(54) ROOF COVER TYPE SOLAR CELL MODULE

(75) Inventor: Tatsuya Komamine, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/962,464

(22) Filed: Oct. 13, 2004

(65) Prior Publication Data

US 2005/0076948 A1    Apr. 14, 2005

(30) Foreign Application Priority Data

Oct. 14, 2003   (JP) .............................. 2003-353615

(51) Int. Cl.
*H01L 31/048* (2006.01)
*E04D 1/30* (2006.01)
*E04D 3/40* (2006.01)
*E04D 13/18* (2006.01)
*E04D 1/28* (2006.01)

(52) U.S. Cl. ...................... 136/251; 136/244; 136/291; 52/173.3; 257/433

(58) Field of Classification Search ................ 136/251, 136/244, 291; 52/173.3; 257/433
See application file for complete search history.

(56) References Cited

FOREIGN PATENT DOCUMENTS

| JP | 4-62716 U | * | 5/1992 |
|---|---|---|---|
| JP | 7-176776 A | * | 7/1995 |
| JP | 10-176388 A | * | 6/1998 |
| JP | 11-324234 | | 11/1999 |
| JP | 2001-173162 A | * | 6/2001 |
| JP | 2001-311283 A | * | 11/2001 |
| JP | 2002-070271 | | 3/2002 |
| JP | 2002-70271 A | * | 3/2002 |
| JP | 2002-88995 A | * | 3/2002 |
| JP | 2002-151725 A | * | 5/2002 |
| JP | 2002-180603 A | * | 6/2002 |
| JP | 2002-180605 A | * | 6/2002 |
| JP | 2003-105939 A | * | 4/2003 |

OTHER PUBLICATIONS

Japanese Notice of Ground of Rejection and English translation thereof mailed Aug. 2, 2005 in corresponding Japanese application No. 2003-353615.

* cited by examiner

*Primary Examiner*—Alan Diamond
(74) *Attorney, Agent, or Firm*—Nixon & Vanderhye, P.C.

(57) ABSTRACT

A roof cover type solar cell module includes a roof cover base member and a power generating unit. The roof cover base member has a mounting surface to which the power generating unit is mounted, and an underlap that can mate with an adjacent roof cover. The power generating unit is mounted to the mounting surface, leaving a part of the mounting surface uncovered. Thus, a roof cover type solar cell module for which a variety of materials can be used for the roof cover base member, which can be produced at low cost, and which is excellent in stability when placed on the roof surface, and also excellent in workability, weather resistance and design property, is provided.

11 Claims, 7 Drawing Sheets

ROOF COVER TYPE SOLAR CELL MODULE

This nonprovisional application is based on Japanese Patent Application No. 2003-353615 filed with the Japan Patent Office on Oct. 14, 2003, the entire contents of which are hereby incorporated by reference.

BACKGROUND OF THE INVENTION

1. Field of the Invention

The present invention relates to a solar cell module. More particularly, the present invention relates to a solar cell module having an outer structure allowing mating with an adjacent roof cover.

2. Description of the Background Art

To secure a solar cell module to a roof surface, in many cases, a stand is placed on a roof cover at the roof surface, and the solar cell module is secured to the stand. With recent diversification of the users' needs, however, a large number of solar cell modules having a solar cell integrated with a roof cover and excellent in design property have been proposed (see, e.g., Japanese Patent Laying-Open Nos. 11-324234, and 2002-070271).

In many of the proposed solar cell modules with the solar cell integrated with the roof cover, however, a power generating unit is housed in a concave portion or a bent portion that is provided in a roof cover base member to be mated with an adjacent roof cover. In such a case, a large area of the roof cover base member would externally be exposed after installation of the solar cell module on the roof surface. Thus, in order not to impair its design, weatherproof coating should be applied to or a weatherproof color steel plate should be used for the roof cover base member, which leads to an increased material cost.

BRIEF SUMMARY

A roof cover type solar cell module is provided for which a variety of materials can be used for its roof cover base member, and which can be formed at low cost, can be placed stably on the roof surface, and is excellent in workability, weather resistance and design property.

The inventors prepared, by way of trial, roof cover type solar cell modules having various structures and studied their properties. As a result, the inventors have found that the roof cover type solar cell module of a certain structure disclosed herein exhibits excellent properties.

Specifically, the roof cover type solar cell module disclosed herein includes: a roof cover base member having a mounting surface and a structure allowing mating with an adjacent roof cover; and a power generating unit mounted to the mounting surface, with a part of the mounting surface exposed.

In the roof cover type solar cell module disclosed herein, the power generating unit covers the mounting surface of the roof cover base member. This can bide the base material of the roof cover base member, and eliminates the need to use a color steel plate or the like for, or apply weatherproof coating on, the roof cover base member, so that considerable cost reduction becomes possible.

As such, the roof cover type solar cell module of the present invention is one for which a variety of materials can be used for the roof cover base member, which can be produced at low cost and can be installed stably on the roof surface, and which is excellent in workability, weather resistance and design property.

Here, the power generating unit may be mounted to the mounting surface, with a part of the mounting surface exposed in the vicinity of at least one vertex of a polygon constituting a contour of the mounting surface.

The mounting surface may have a contour of n-gon (n is a natural number) and the power generating unit may have a contour of (n+1)-gon or (n+2)-gon (n is a natural number). Further, the mounting surface may have a contour of tetragon and the power generating unit may have a contour of pentagon or hexagon with one or two vertices of the tetragon congruent with the mounting surface truncated.

The exposed part of the mounting surface may be provided with a hole for driving a nail or a screw in so as to secure the roof cover base member to the adjacent roof In this case, the hole for driving a nail or a screw in may be provided on a projection that is formed at the exposed part of the mounting surface. The projection is configured to have a height greater than a thickness of the power generating unit.

Further, an intermodule fixing tool may be attached to the exposed part of the mounting surface. In this case, the intermodule fixing tool is configured such that, when a plurality of such roof cover type solar cell modules are placed on a roof surface, the roof cover type solar cell modules located at the eaves side and the ridge side are secured to each other.

The power generating unit may be mounted to the mounting surface, with a part of the mounting surface exposed in the vicinity of at least one vertex of a polygon constituting a contour of the mounting surface.

Further, the roof cover base member may be provided with a notch that is open to the ridge side. The notch is configured to make a terminal box provided at the power generating unit exposed to the roof surface side.

The roof cover base member and the power generating unit may be secured by adhesion. Further, the roof cover base member may be provided with a concave portion configured to receive an adhesive therein.

Still further, the roof cover base member may have a facing cover attached on the eaves side. The facing cover is configured to cover the eaves side end portion of the roof cover base member when the roof cover type solar cell module is placed on the roof surface.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
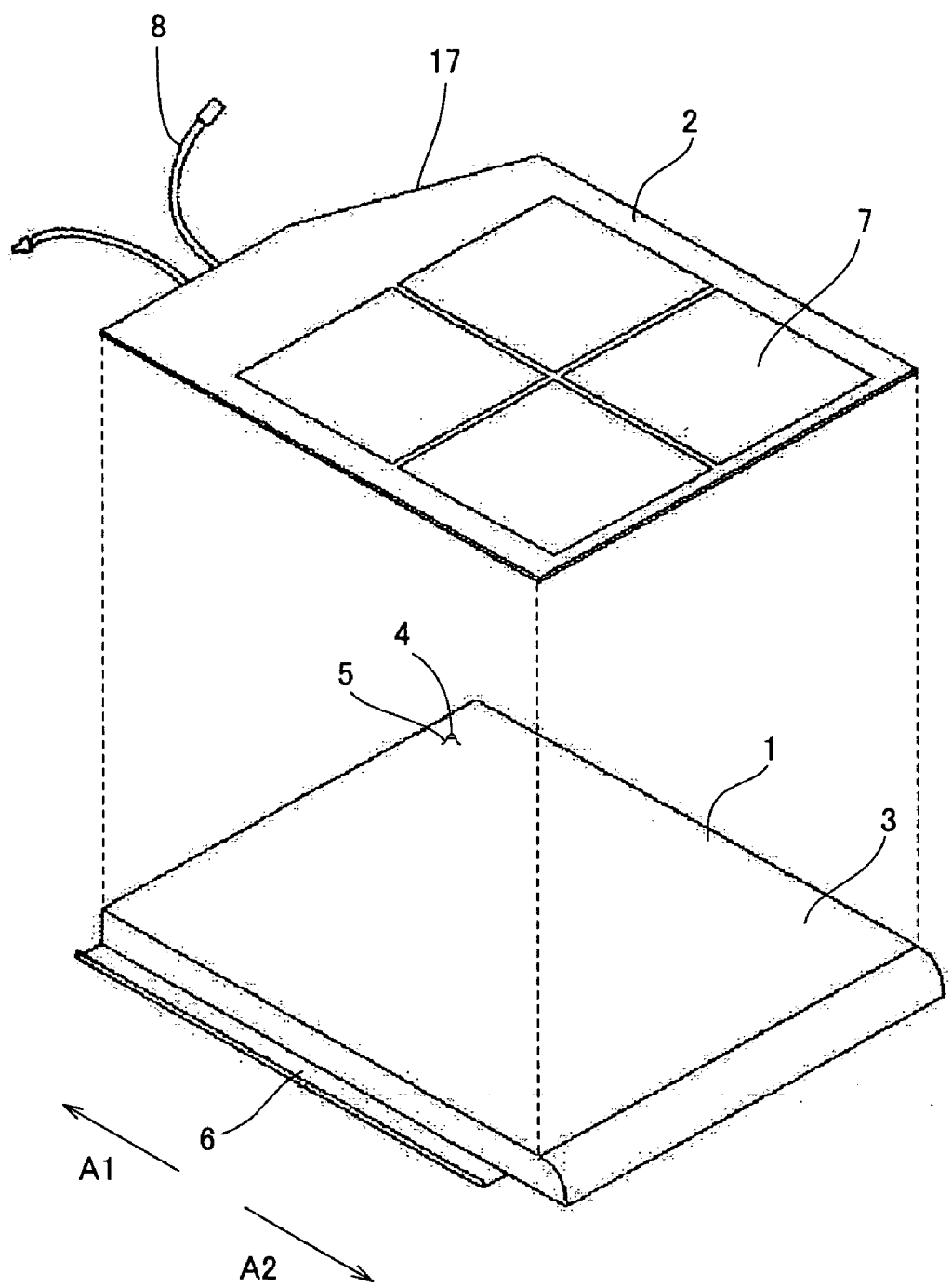
FIG. 1 is a perspective view of an example of a roof cover type solar cell module according to example embodiment, shown in the state where a roof cover base member and a power generating unit are separated from each other.

FIG. 1 shows an example embodiment of roof cover type solar cell module, with the roof cover base member and the power generating unit separated from each other.

In the present embodiment, description will be made based on a solar cell module having an outer structure that allows mating with a plain roof tile of which working region (i.e., part exposed on the roof surface after installation) has a working width of 305 mm and a working length of 280 mm. The roof cover type solar cell module shown in FIG. 1 is placed on the roof surface so that the direction indicated by an arrow A1 corresponds to the ridge side and the direction indicated by an arrow A2 corresponds to the eaves side.

In FIG. 1, a roof cover base member 1 is provided with a mounting surface 3 for mounting a power generating unit 2 thereto, and an underlap 6 for mating with an adjacent roof cover such as a roof tile. Roof cover base member 1 may be made of an aluminum plate, stainless steel plate, galvalium steel plate, zinc-aluminum-magnesium alloy plated steel plate or the like, which may be used with or without coating. Roof cover base member 1 preferably has a thickness of greater than 0.6 mm for the purpose of ensuring strength.

Power generating unit 2 preferably has a superstrate structure where solar cells 7, each including a semiconductor member of monocrystalline sheet type, polycrystalline sheet type or amorphous type structure, are sandwiched between a glass and a weatherproof film and sealed with a resin. Alternatively, power generating unit 2 may have a substrate structure where a transparent film is used instead of the glass described above. Power generating unit 2 is provided, e.g., with a terminal box 11 (see FIG. 2A as will be explained later) and a cable 8 for drawing out power therefrom.

Figure 5:
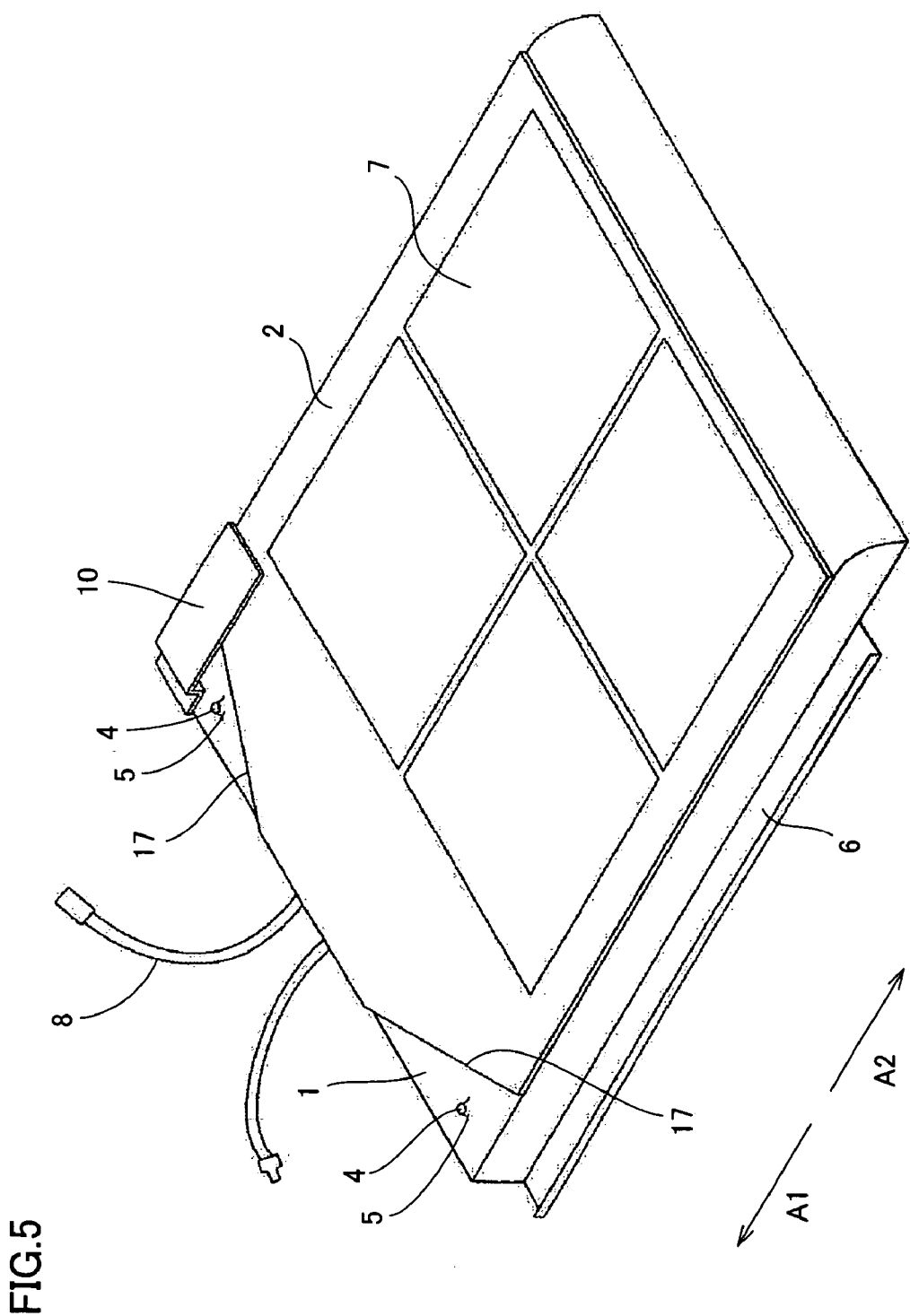
FIG. 5 is a perspective view of an example of the roof cover type solar cell module.

Preferably, the power generating unit is mounted to the mounting surface of the roof cover base member, with a part of the mounting surface left uncovered. More preferably, the power generating unit is mounted to the mounting surface in such a manner that the power generating unit does not cover the mounting surface in the vicinity of at least one vertex of a polygon constituting the contour of the mounting surface. Still more preferably, the contour of the mounting surface is an n-gon (n is a natural number), and the contour of the power generating unit is an (n+1)-gon or an (n+2)-gon (n is a natural number). It is particularly preferable that the contour of the mounting surface be a tetragon, and the contour of the power generating unit be a pentagon or a hexagon formed by truncating one or two vertices of a tetragon that is congruent with the mounting surface tetragon, FIG. 1 shows the case where mounting surface 3 of roof cover base member 1 has a contour of tetragon, and power generating unit 2 has a contour of pentagon with a truncation 17 formed at one vertex of the tetragon congruent with mounting surface 3. Similarly, FIG. 5 shows a power generating unit having a shape obtained by truncating two vertices of a tetragon that otherwise (before truncation) would be congruent with the mounting surface, so that the power generating unit after truncation acquires the shape of a septagon. Thus, in general the power generating unit has a shape obtained by truncating one or more vertices of n-gon that otherwise (before truncation) would be congruent with the mounting surface, n being a natural number of at least 3.

At least one hole for driving a nail or a screw in is preferably provided in the part of the mounting surface uncovered by the power generating unit, to secure the roof cover base member to an adjacent roof. FIG. 1 shows the case where a screw hole 4 for securing roof cover base member 1 to the roof surface is provided in the vicinity of one vertex of roof cover base member 1. This screw hole 4 is provided on a projection 5 for the purposes of preventing water from entering and facilitating the work of screwing. Projection 5 has a height greater than the thickness of power generating unit 2. Power generating unit 2 shown in FIG. 1 has a contour of a pentagon with truncation 17 formed at one vertex of the tetragon. Truncation 17 is formed with a particular size at a particular position so that projection 5 is uncovered by power generating unit 2 when power generating unit 2 is mounted to mounting surface 3 of roof cover base member 1. Screw hole 4 is preferably placed at the ridge side A1 of roof cover base member 1, since it needs to be approximately aligned with a screw hole of the adjacent roof cover.

Figure 6:
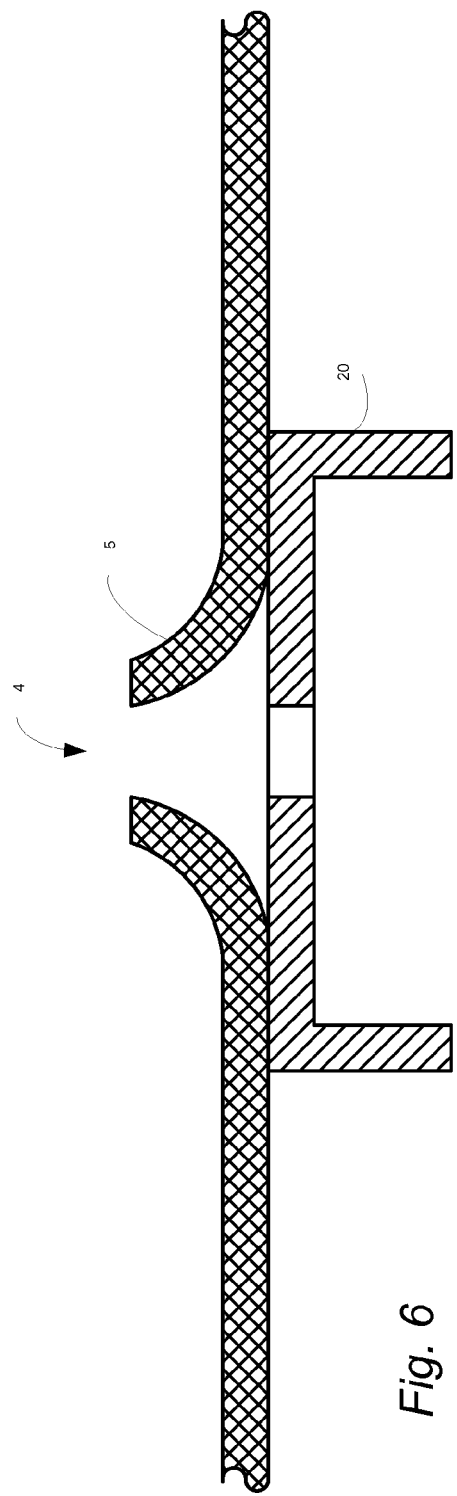
FIG. 6 is a sectioned side view of a portion of a roof cover base member and a first example U-shaped reinforcing angle inserted at a back of the hole of the roof cover base member.
Figure 7:
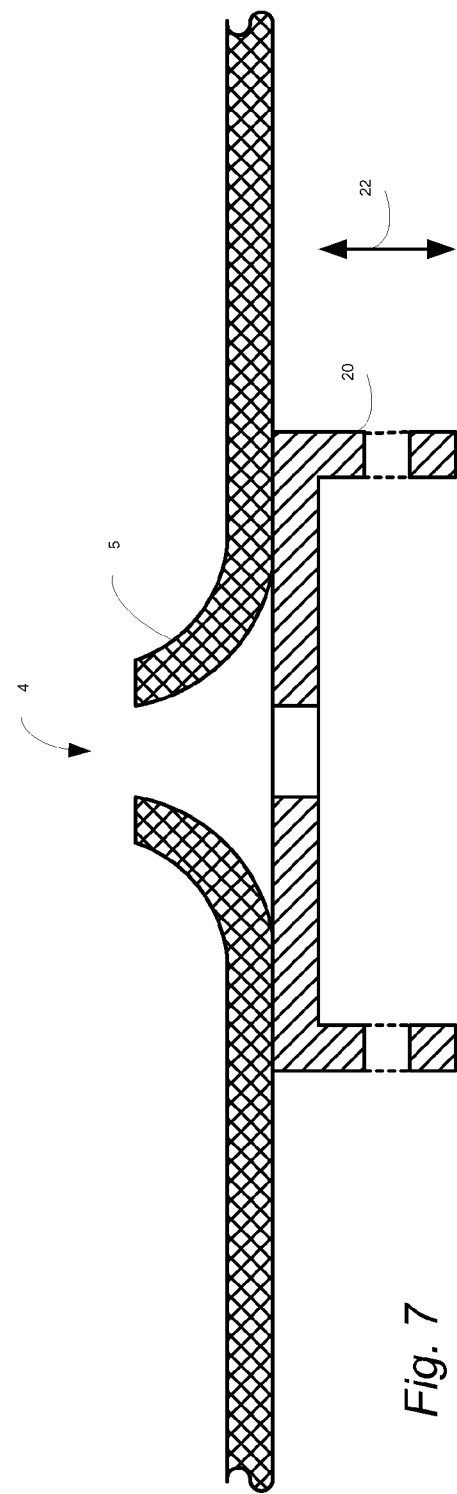
FIG. 7 is a sectioned side view of a portion of a roof cover base member and a height adjustable U-shaped reinforcing angle.
Figure 8:
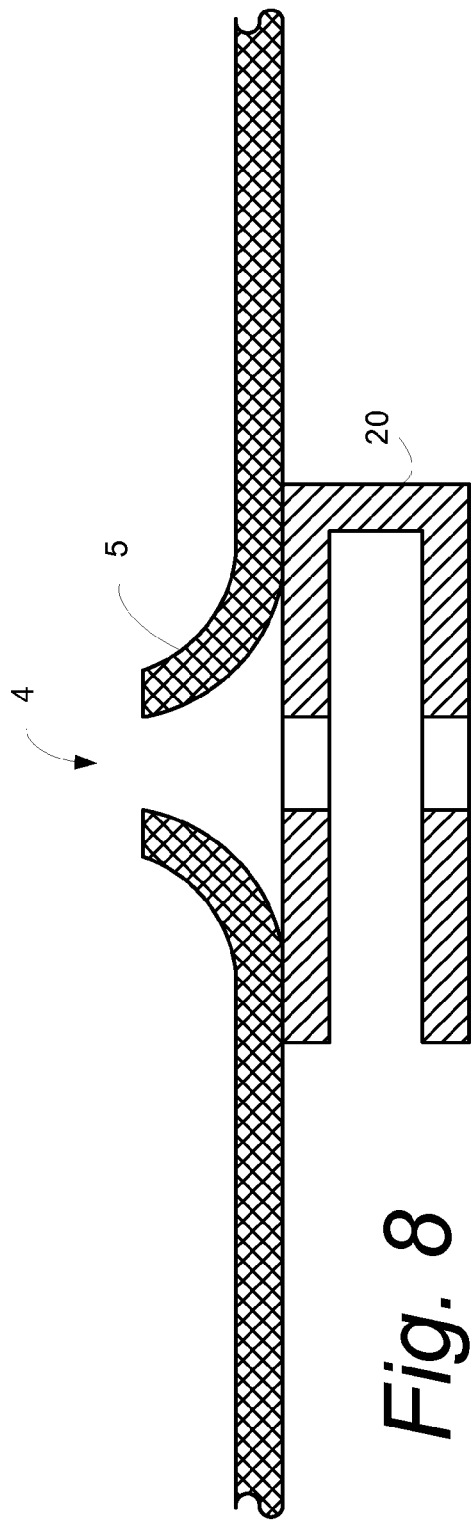
FIG. 8 is a sectioned side view of a portion of a roof cover base member and a second example U-shaped reinforcing angle inserted at a back of the hole of the roof cover base member.
Figure 9:
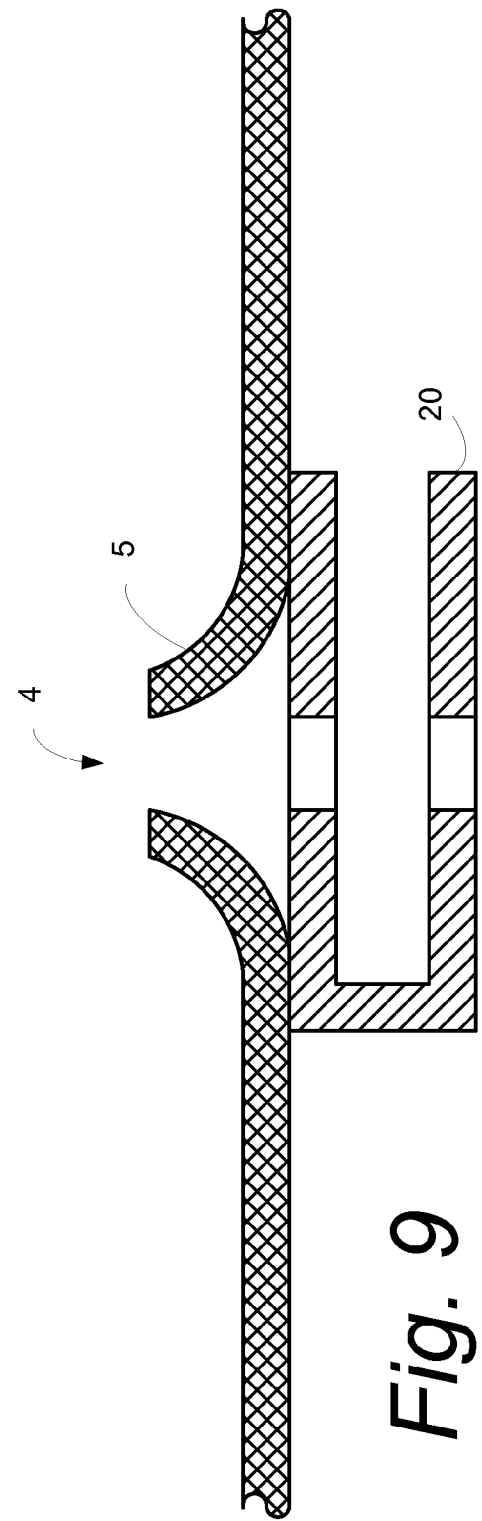
FIG. 9 is a sectioned side view of a portion of a roof cover base member and a third example U-shaped reinforcing angle inserted at a back of the hole of the roof cover base member.

Upon securing roof cover base member 1 to the roof surface with a screw, insufficient strength of roof cover base member 1 will lead to deformation of the part around screw hole 4 due to screwing. To avoid this, a U-shaped, reinforcing angle 20 may be inserted at the back of screw hole 4 of roof cover base member 1 (see examples in FIG. 6, FIG. 8, FIG. 9). In this case, the height of the U-shaped reinforcing angle is preferably made adjustable (as indicated by adjustment arrow 22 for the FIG. 6 embodiment in FIG. 7), which can make the heights of roof cover base member 1 and the adjacent roof cover adjustable as well. Further, in the case where the neighboring roof covers are of the type hooked and secured on tile battens, the U-shaped reinforcing angle 20 may be processed to have a bent portion so that it can be hooked on the tile batten as well.

When the roof cover type solar cell module is installed on the roof surface, power generating unit 2 is exposed as the working region. Since a transparent glass or a transparent film is provided at the outermost surface of power generating unit 2, the externally visible color of power generating unit 2 largely depends on solar cells 7 and the weatherproof film. In the present invention, the colon of solar cells 7 and the weatherproof film may be matched wit the color of the neighboring roof covers, so as to provide a roof cover type solar cell module having sense of unity wit the neighboring roof covers in terms of design. Alternatively, the colors of solar cells 7 and the weatherproof film may be differentiated from that of the neighboring roof covers so as to make the solar cell portion distinctive.

Figure 2A:
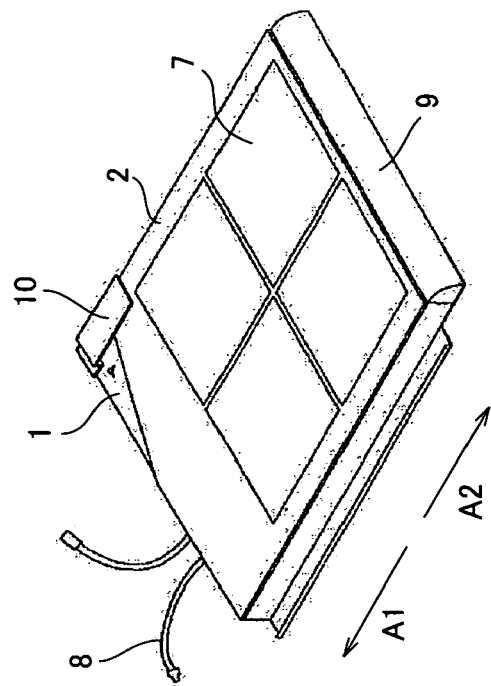
FIGS. 2A and 2B are perspective views of an example of the roof cover type solar cell module of example embodiment, seen from the back and the front, respectively.
Figure 2B:
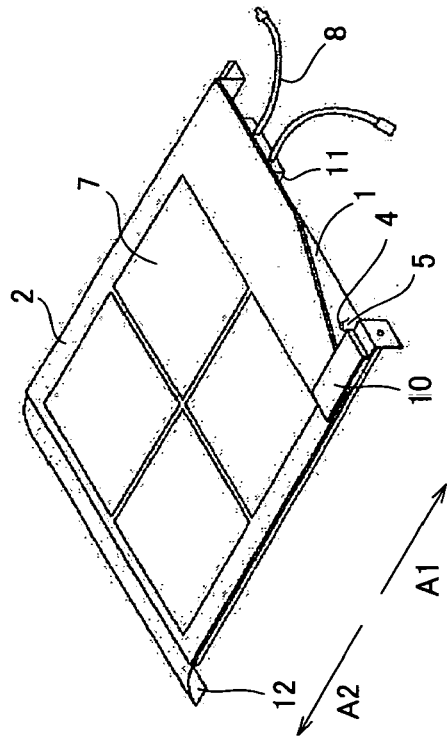
Figure 3B:
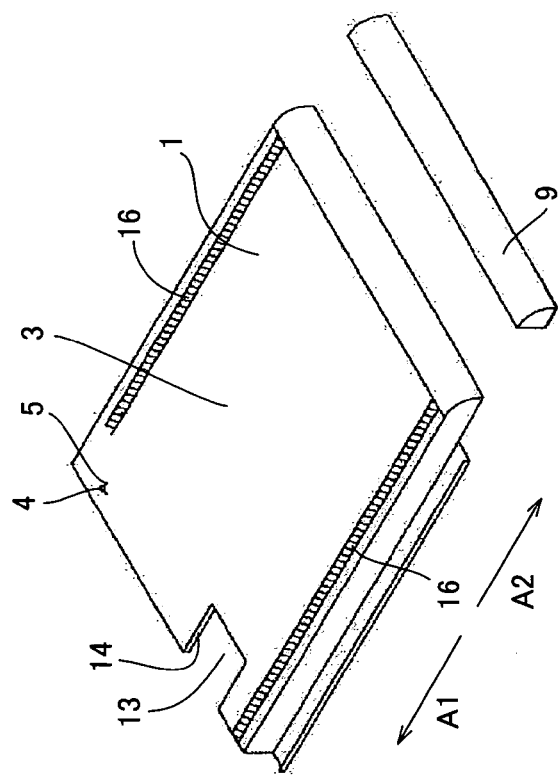
FIGS. 3A and 3B are perspective views of the roof cover base member 1 of the roof cover type solar cell module shown in FIGS. 2A and 2B, seen from the back and the front, respectively.
Figure 3A:
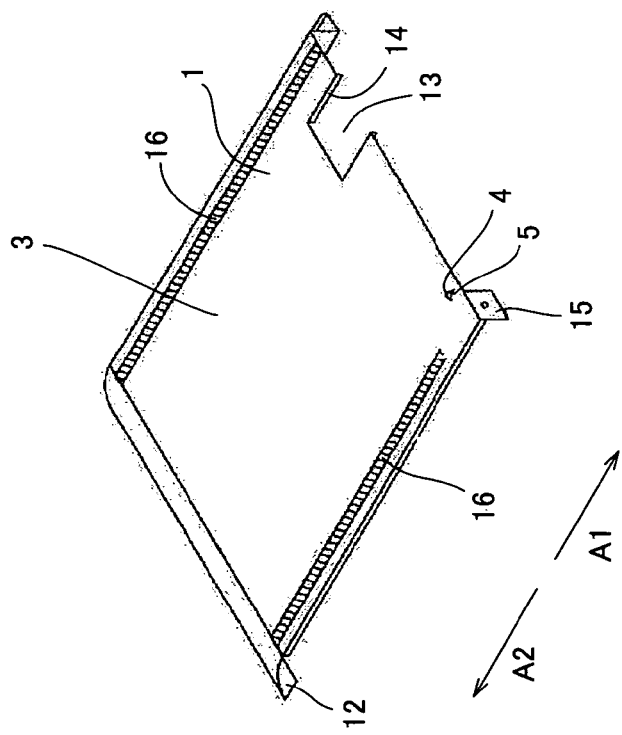

FIGS. 2A and 28 are perspective views of an example of the roof cover type solar cell module, seen from the back and the front, respectively. FIGS. 3A and 3B are perspective views of roof cover base member 1 of the roof cover type solar cell module shown in FIGS. 2A and 2B, seen from the back and the front, respectively.

In the present embodiment, in the case where terminal box 11 for drawing out power is placed on the back side of power generating unit 2, a notch 13 is provided at roof cover base member 1 to expose terminal box 11 to the roof surface side. Notch 13 is made open to the ridge side A1. Notch 13 may be provided with a bent portion 14 for alignment of terminal box 11 with roof cover base member 1.

The roof cover type solar cell module preferably has an intermodule fixing tool 10 provided at the part of mounting surface 3 of roof cover base member 1 uncovered by power generating unit 2, as shown in FIGS. 2A, 2B, 3A and 3B, so that when a plurality of such roof cover type solar cell modules are to be installed on the roof surface, the neighboring roof cover type solar cell modules placed at the eaves side A2 and the ridge side A1 are secured to each other by means of intermodule fixing tool 10. Specifically, as shown in FIGS. 2A, 2B, 3A and 3B, a bent portion 15 for intermodule fixing tool is provided at the ridge side A1 of roof cover base member 1 and, with a burring hole provided at bent portion 15, intermodule fixing tool 10 is attached thereto. Intermodule fixing tool 10 preferably has a metal as its material for the purposes of ensuring strength and others. Intermodule fixing tool 10 may be fixed to roof cover base member 1 in any maimer. For example, they may be secured using a bolt and a nut, or may be secured by adhesion or riveting. The shape of intermodule fixing tool 10 is preferably designed to guarantee a spacing of 2 mm to 3 mm between intermodule fixing tool 10 and power generating unit 2.

Preferably, intermodule fixing tool 10 is formed by bending a metal plate to have a flat face in contact with bent portion 15 for intermodule fixing tool for attachment of intermodule fixing tool 10, a flat face in contact with mounting surface 3 of roof cover base member 1, and a flat face erected therefrom and extending in parallel with mounting surface 3. Intermodule fixing tool 10 is preferably made of an aluminum plate, stainless steel plate, galvalium steel plate, zinc-aluminum-magnesium alloy plated steel plate or the like.

The roof cover type solar cell module preferably includes roof cover base member 1 and power generating unit 2 fixed to each other by adhesion. In this case, as shown in FIGS. 3A and 3B, the roof cover base member is preferably provided with a concave portion 16 that can receive an adhesive therein. Applying the adhesive in concave portion 16 enables adhesion of roof cover base member 1 and power generating unit 2 while preventing the adhesive from externally running off.

Although power generating unit 2 rested on mounting surface 3 of roof cover base member 1 can prevent external exposure of the color of the base material of roof cover base member 1, the edge of roof cover base member 1 at the eaves side A2 may still be exposed. To avoid this, roof cover base member 1 may be coated, or a facing cover 9 may be attached to hide the edge. Facing cover 9 is preferably made of a color galvalium steel plate, aluminum plate, colorless steel plate or the like. Facing cover 9 may be fixed to roof cover base member 1 by adhesion, caulking by bending, or screwing.

Figure 4:
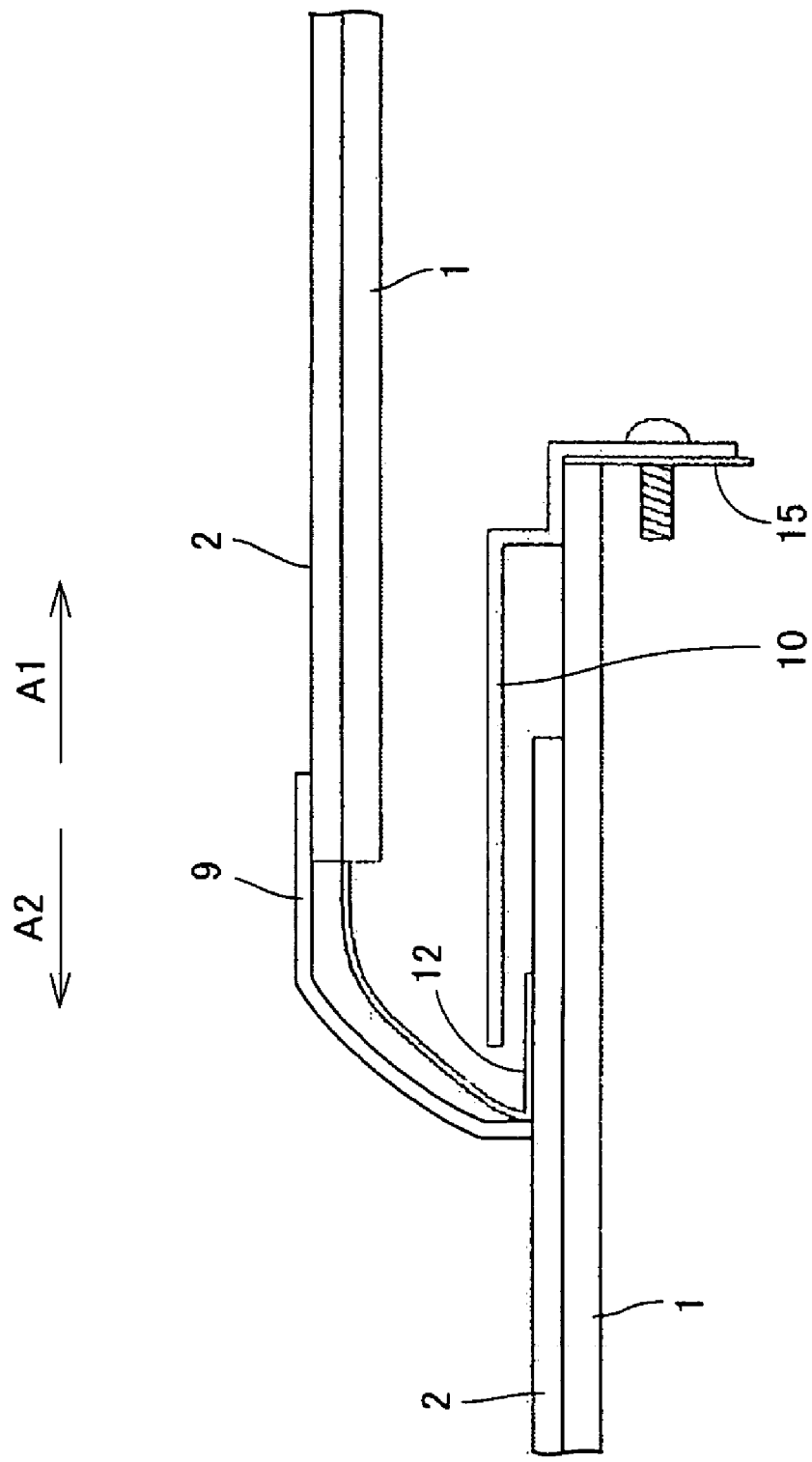
FIG. 4 is a cross sectional view showing by way of example roof cover type solar cell modules in the installed state.

FIG. 4 is a cross sectional view showing, by way of example, roof cover type solar cell modules in the installed state. Preferably, the roof cover type solar cell module is provided with a rib 12 at the eaves side A2 of roof cover base member 1, When a plurality of such roof cover type solar cell modules are to be installed on the roof surface, rib 12 of one module is hooked on intermodule fixing tool 10 of the adjacent module on the eaves side A2. In the example shown in FIG. 4, rib 12 is provided at the eaves side A2 of roof cover base member 1, and the rib is inserted into the spacing provided between intermodule fixing tool 10 and power generating unit 2 as to be hooked, and thus, the module at the ridge side A1 and the module at the eaves side A2 are secured to each other. Facing cover 9 is provided at the eaves side end portion of roof cover base member 1 to cover rib 12, and thus, power generating unit 2 of the module on the ridge side 42 is secured as it is sandwiched between roof cover base member 1 of its own and facing cover 9 of the adjacent module on the eaves side A1.

If rib 12 is insufficient in strength, an angle as a reinforcing member may be attached thereto. In this case, the reinforcing member is preferably made of an aluminum plate, stainless steel plate, galvalium steel plate, zinc-aluminum-magnesium alloy plated steel plate, or the like.

FIG. 5 is a perspective view of an example of the roof cover type solar cell module.

As shown in FIG. 5, when mounting surface 3 of roof cover base member 1 is a tetragon, power generating unit 2 is preferably a hexagon having truncations 17 formed at two vertices thereof, since such a shape is advantageous in the case where two screw holes 4 are required to ensure strength of attachment to the roof surface.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A roof cover solar cell module, comprising:
    a roof cover base member having a mounting surface and a structure allowing mating with an adjacent roof cover; and
    a power generating unit mounted to said mounting surface so as to leave an exposed part of said mounting surface not covered by the power generating unit;
    a projection formed on said exposed part of said mounting surface, and said projection having a height greater than a thickness of said power generating unit;
    at least one hole provided in the projection for accommodating a nail or a screw for securing said roof cover base member to an adjacent roof; and
    a U-shaped reinforcing angle inserted at a back of the hole of the roof cover base member.

2. The roof cover solar cell module according to claim 1, wherein said power generating unit is mounted to said mounting surface, with a part of said mounting surface exposed in the vicinity of at least one vertex of a polygon constituting a contour of said mounting surface.

3. The roof cover solar cell module according to claim 1, wherein said mounting surface has a contour of an n-gon, wherein said power generating unit has a contour of an (n+1)-gon or (n+2)-gon, and wherein n is a natural number of at least 3.

4. The roof cover solar cell module according to claim 1, wherein said mounting surface has a contour of a tetragon, and said power generating unit has a contour of a pentagon or hexagon formed by truncating one or two vertices of a tetragon that is congruent with the mounting surface tetragon.

5. The roof cover solar cell module according to claim 1, wherein an intermodule fixing tool is attached to said exposed part of said mounting surface, and said intermodule fixing tool is configured such that, when a plurality of said roof cover solar cell modules are placed on a roof surface, roof cover solar cell modules located at an eaves side and a ridge side are secured to each other.

6. The roof cover solar cell module according to claim 5, wherein said roof cover solar cell module located at the ridge side is provided with a rib on the eaves side of its roof cover base member, and said rib is configured to be hooked on said intermodule fixing tool of a roof cover solar cell module located at the eaves side.

7. The roof cover solar cell module according to claim 1, wherein said roof cover base member is provided with a notch that is open to a ridge side, and said notch is configured to make a terminal box provided at said power generating unit exposed to a roof surface side.

8. The roof cover solar cell module according to claim 1, wherein said roof cover base member and said power generating unit are secured by adhesion.

9. The roof cover solar cell module according to claim 1, wherein said roof cover base member is provided with a concave portion configured to receive an adhesive therein.

10. The roof cover solar cell module according to claim 1, wherein said roof cover base member has a facing cover attached on an eaves side, and said facing cover covers the eaves side end portion of said roof cover base member when said roof cover solar cell module is placed on a roof surface.

11. The roof cover type solar cell module according to claim 1, wherein the U-shaped angle is adjustable in height.

\* \* \* \* \*